United States Patent
Haemers et al.

(10) Patent No.: US 10,259,024 B2
(45) Date of Patent: Apr. 16, 2019

(54) DEVICE, SYSTEM AND PROCESS FOR TREATING POROUS MATERIALS

(71) Applicant: Soil Research Lab sprl, Waterloo (BE)

(72) Inventors: Jan Haemers, Brussels (BE); Hatem Saadaoui, Brussels (BE)

(73) Assignee: SOIL RESEARCH LAB SPRL, Waterloo (BE)

( * ) Notice: Subject to any disclaimer, the term of this patent is extended or adjusted under 35 U.S.C. 154(b) by 0 days.

(21) Appl. No.: 15/520,750

(22) PCT Filed: Oct. 21, 2015

(86) PCT No.: PCT/EP2015/074347
§ 371 (c)(1),
(2) Date: Apr. 20, 2017

(87) PCT Pub. No.: WO2016/062757
PCT Pub. Date: Apr. 28, 2016

(65) Prior Publication Data
US 2017/0312798 A1 Nov. 2, 2017

(30) Foreign Application Priority Data

Oct. 21, 2014 (BE) .................................. 2014/0781

(51) Int. Cl.
*B09C 1/02* (2006.01)
*B09C 1/10* (2006.01)
(Continued)

(52) U.S. Cl.
CPC ............ *B09C 1/06* (2013.01); *B09C 2101/00* (2013.01)

(58) Field of Classification Search
CPC .......... A01G 11/00; A62D 3/00; B09C 1/002; B09C 1/005; B09C 1/02; B09C 2101/00;
(Continued)

(56) References Cited

U.S. PATENT DOCUMENTS 3,237,689 A * 3/1966 Justheim ............. E21B 43/2403
166/247
3,911,683 A * 10/1975 Wolf ....................... F28D 15/02
60/641.2

(Continued)

FOREIGN PATENT DOCUMENTS

EP 0379743 A1 8/1990
EP 0548766 A2 6/1993
(Continued)

OTHER PUBLICATIONS

International Search Report of the International Searching Authority for International Application No. PCT/EP2015/074347, dated Mar. 2, 2016.

(Continued)

*Primary Examiner* — Benjamin F Fiorello
*Assistant Examiner* — Edwin J Toledo-Duran
(74) *Attorney, Agent, or Firm* — Knobbe Martens Olson & Bear LLP

(57) ABSTRACT

The invention provides a method and a system for treating and/or decontaminating porous materials and/or aquifer layers, including at least one housing, at least one heating module, one module for injecting pressurized liquid and one recovery module. The heating means is capable of being introduced in the porous material, and includes at least one heating tube having a heat-conducting outer wall. The heating tube can be connected to the heating module. At least one pressurized-liquid injection tube is included which can be connected to the pressurized-liquid injection module. The system includes at least one vapor-extraction means for extracting the contaminant vapor. The extraction means is capable of creating the vacuum in the porous material and can be connected to the recovery module, and at least one
(Continued)

layer of sealing material that can be applied to the surface of the porous material to be treated.

14 Claims, 7 Drawing Sheets

(51) Int. Cl.
*B09C 1/00* (2006.01)
*B09C 1/08* (2006.01)
*B09C 1/06* (2006.01)

(58) Field of Classification Search
CPC .......... B09C 1/025; B09C 1/06; B09C 1/062; B09C 1/065; B09C 1/067; B09C 1/00; B09C 1/08; B09C 1/085; B09C 1/10; B09C 1/105; A01B 43/00
USPC ..... 405/128.1, 128.15, 128.2, 128.25, 128.3, 405/128.35, 128.4, 128.45, 128.5, 128.55, 405/128.6, 128.7, 128.75, 128.85
See application file for complete search history.

(56) References Cited

U.S. PATENT DOCUMENTS

| | | | | |
|---|---|---|---|---|
| 4,094,356 A * | 6/1978 | Ash | .......... | F24T 10/30 165/299 |
| 4,512,156 A * | 4/1985 | Nagase | .......... | F24T 10/17 60/641.2 |
| 4,694,907 A | 9/1987 | Stahl et al. | | |
| 4,778,606 A * | 10/1988 | Meenan | .......... | B09C 1/06 110/238 |
| 5,009,266 A * | 4/1991 | Dieter | .......... | B09C 1/00 166/245 |
| 5,011,329 A * | 4/1991 | Nelson | .......... | B09C 1/06 405/128.65 |
| 5,111,883 A * | 5/1992 | Savery | .......... | B09C 1/005 166/267 |
| 5,181,796 A * | 1/1993 | DeYoung | .......... | B01D 53/72 405/128.35 |
| 5,251,700 A * | 10/1993 | Nelson | .......... | B09C 1/06 166/305.1 |
| 5,325,795 A * | 7/1994 | Nelson | .......... | B09C 1/06 110/204 |
| 5,393,501 A * | 2/1995 | Clawson | .......... | A61L 2/07 110/226 |
| 5,464,309 A * | 11/1995 | Mancini | .......... | B09C 1/005 166/236 |
| 5,480,549 A * | 1/1996 | Looney | .......... | B09C 1/10 166/68 |
| 5,660,500 A * | 8/1997 | Marsden, Jr. | .......... | B09C 1/00 405/128.4 |
| 5,664,911 A * | 9/1997 | Bridges | .......... | B09C 1/00 405/128.4 |
| 5,746,987 A * | 5/1998 | Aulbaugh | .......... | B01D 3/085 422/610 |
| 5,753,109 A * | 5/1998 | Looney | .......... | B09C 1/10 166/68 |
| 5,765,964 A * | 6/1998 | Calcote | .......... | B09C 1/002 166/272.1 |
| 5,769,569 A * | 6/1998 | Hosseini | .......... | B09C 1/062 166/370 |
| 5,788,412 A * | 8/1998 | Jatkar | .......... | B09C 1/005 166/272.1 |
| 6,102,622 A * | 8/2000 | Vinegar | .......... | B09C 1/06 166/272.7 |
| 6,596,142 B2 * | 7/2003 | McGee | .......... | B09C 1/06 204/515 |
| 6,632,047 B2 * | 10/2003 | Vinegar | .......... | B09C 1/062 405/128.15 |
| 6,824,328 B1 * | 11/2004 | Vinegar | .......... | B09C 1/062 166/60 |
| 6,962,466 B2 * | 11/2005 | Vinegar | .......... | B01D 53/002 405/128.4 |
| 2003/0147697 A1 * | 8/2003 | Brady | .......... | B09C 1/06 405/128.15 |
| 2003/0183390 A1 * | 10/2003 | Veenstra | .......... | B09C 1/02 166/302 |
| 2003/0192691 A1 * | 10/2003 | Vinegar | .......... | B09C 1/02 166/250.12 |
| 2011/0027018 A1 * | 2/2011 | Baker | .......... | B09C 1/08 405/128.6 |
| 2012/0263538 A1 * | 10/2012 | Hanasaka | .......... | H05B 6/107 405/128.85 |
| 2014/0363234 A1 * | 12/2014 | Hamilton | .......... | B09C 1/06 405/128.85 |

FOREIGN PATENT DOCUMENTS

| | | |
|---|---|---|
| GB | 2098644 A | 11/1982 |
| JP | 01-139901 A | 6/1989 |

OTHER PUBLICATIONS

Written Opinion of the International Searching Authority for International Application No. PCT/EP2015/074347, dated Mar. 2, 2016.
Third Party Observation for International Application No. PCT/EP2015/074347, dated Jul. 4, 2016.

* cited by examiner

DEVICE, SYSTEM AND PROCESS FOR TREATING POROUS MATERIALS

CROSS-REFERENCE TO RELATED APPLICATIONS

This application is the U.S. National Phase under 35 U.S.C. § 371 of International Application PCT/EP2015/074347, filed Oct. 21, 2015, which claims priority to BE2014/0781, filed Oct. 21, 2014.

This invention relates to a system, a device and a process to thermally treat porous materials and/or aquifers. This invention can be used to treat soil, aquifers, the phreatic zone and any material contaminated by volatile and semi-volatile components.

PRIOR ART

Contamination of porous materials such as soil is a subject of major concern. Soils can be contaminated by chemical, biological and/or radioactive contaminants. Decontamination of these soils is essential to protect the environment and the public health.

Soils can be decontaminated by thermal desorption, which consists in breaking down contaminants by the effect of the increase in soil temperature to be treated. Thermal desorption can be implemented in situ by injecting heat into the soils or ex situ and thus on excavated material. Thermal desorption allows volatile and semi-volatile contaminants to be extracted. A particular in situ thermal desorption method uses pressurized water vapor injection into the soil to be treated, soil heating and contaminant vapour extraction by vacuum pumping outside of the treated soil.

In situ soil decontamination systems and processes by water vapor injection have been described in the prior art. These systems and processes use large amounts of energy for the heating process. An important part of this energy is wasted when transporting water vapor to or from the soil. The contaminants that are vaporized travel long distances through thermally non-insulated materials to reach a treatment facility. From an energy standpoint, these processes are costly and not environmentally-friendly.

The installation of these systems is complex because of the use of components, such as piping and tubes, which are large, voluminous, and designed for high pressures and temperatures. The decontamination processes using prior art systems are lengthy and costly.

Therefore, there is a need to reduce energy loss, delays and cost of the soil decontamination process by vapor injection. This invention aims at providing a solution to at least one of the afore-mentioned issues. This invention provides processes and systems for decontaminating soils while achieving energy, time and cost savings. Besides, this invention is intended to provide a method and a system for remediating soil, in which the procedure of the remediation process can be controlled remotely.

SUMMARY OF THE INVENTION

In a first aspect, this invention provides a process for treating and/or decontaminating porous materials and/or aquifers comprising the following steps:
creating in the porous material at least one heater well to heat said porous material, said heating well comprising at least one heating tube and at least one pressurized liquid injection tube,
creating in said porous material at least one extraction well for extracting the contaminants vapor,
applying to the surface of the porous material a layer of watertight material,
connecting the heater well and the extraction well to at least a housing comprising at least one heating module, one pressurized liquid injection module and one recovery module, said housing being placeable outside of the porous material,
supplying heat, via the heater module, into the heater tube, thus heating the heater well,
injecting, via the injection module, at least one liquid in the injection tube in order to vaporise and/or evaporate the injected liquid and the contaminants present in the porous material, thereby transforming the contaminants in vapor of contaminants, and
extracting, via the extraction module, the vapor of contaminants generated in the porous material being treated and/or at least a part of the liquid present in said porous material via the extraction well.

In another aspect, the present invention provides a system to treat and/or decontaminate porous materials and/or aquifers. The system comprises:
at least one housing comprising at least one heating module, one pressurized liquid injection module and one recovery module, said housing can be placed outside the porous material to be treated,
heating means that are susceptible to being inserted into the porous material, said heating means comprising at least one heater tube having an external wall that is thermally conductive, said heater tube can be connected to the heater module; and at least one pressurized liquid injection tube that can be connected to the pressurized liquid injection module, said heater and liquid injection tubes have no perforations,
at least one means of extracting vapor in order to extract contaminant vapors, said extraction means can be created inside the porous material and connected to the recovery module, and
at least one layer of watertight material applicable at the surface of the porous material to be treated.

In another aspect, the present invention provides the use of the system of the invention for treating and/or decontaminating porous materials and/or aquifers according to the process of the invention.

LVI process and LVI system refer in this document to respectively a process and a system of the invention. LVI refers to liquid vapor injection (Liquid vapor injection).

The invention is described in what follows with reference to a soil as an example. The system and process of this invention are not limited to treating soils and can be used to treat any other porous material and/or aquifer. The treatment of the latter is thus covered by this invention. Hence, any reference to a "soil" here below also refers to any porous material and/or aquifers. The system and process of this invention are used for decontamination and/or any other treatment of porous materials and/or aquifer.

The system, device and process of thermal treatment of soils of this invention has several advantages compared to systems, devices and methods described in the prior art. Among these advantages, we can cite:
low thermal losses towards the outside: traditional processes for injecting water vapor use a vapour production unit and a surface circuit to feed water vapor to the injection wells. This complex installation inevitably leads to considerable heat loss to the outside through the supply circuits and generally requires a large energy consumption to take into account these losses. A substantial part of the vapor condenses in the circuit even before reaching the injection well. This partly condensation results in a pressure drop of the vapor in the injection well and in the soil. The process of this invention injects liquid water directly into the well. The water vapor is only produced in the injection well. All the heat conveyed by the vapor is used to heat the soil and the thermal losses to the outside are virtually zero.

the system is free of high pressure and high temperature surface conduits: in order to deliver water vapor to the injection wells, traditional processes use a relatively complex and costly surface circuit that has to withstand a pressure of more than 10 bars. Direct injection of liquid water in the wells is a cheaper alternative with a simpler execution. Surface circuits refers to conduits that are located above the soil.

no pressure losses and thus pressure drops in the injection wells: traditional processes use a huge surface circuit to supply injection wells with water vapor. Circulating vapor through these circuits inevitably generates pressure losses and leads to a pressure drops. To overcome this problem, more powerful and costly machines are used. The LVI process only requires small high-pressure liquid injection pumps to inject liquid water directly into the wells.

a better adjustment of treatment time thanks to an easy regulation of process parameters: during the operation of the LVI process, the water vapor pressure in the injection well controls the speed of water vapor circulation through the soil. The pressure is adjusted with the temperature of the heater element (heating power) and with the flow of water being injected. These parameters are easy to control and determine the treatment time.

no external addition of water for the treatment: the LVI process reuses soil water recovered from the extraction wells to resupply the injection wells. The recovered water is processed before being used. At the end of the treatment, this same water will be used to cool-down and restore soil humidity in order to put the site back into its original condition before treatment.

low-cost installation: the elements that constitute the LVI installation are simple and less costly than those of a classical installation. The injection well contains a metallic tube equipped with a gas burner or an electrical resistance (heating element), a metallic tube for injecting liquid water connected to a small water pump and a small-diameter flexible hose to supply the pump. The extraction well comprises a perforated metallic tube.

All liquids collected are separated. The recovered water is treated and then used to re-supply the wells. Pure products are collected and stored on site.

flexible installation: each well possesses its own heating circuit and its own water supply circuit. This way, the installation on each treated patch of land can be disassembled without disturbing other areas that are still undergoing treatment.

more efficient treatment than a traditional process since LVI allows to achieve temperatures in the soil well in excess of 100° C.

operation is adapted to the site: depending on the site nature (concentration of the pollutants, humidity, permeability, . . . ), a periodical and alternated operation of the system with a period of injection followed by a period without injection, all while maintaining vacuum extraction can reduce the amount of water required for the treatment and can also reduce the overall treatment time.

DESCRIPTION OF EXEMPLARY EMBODIMENTS

Figure 1:
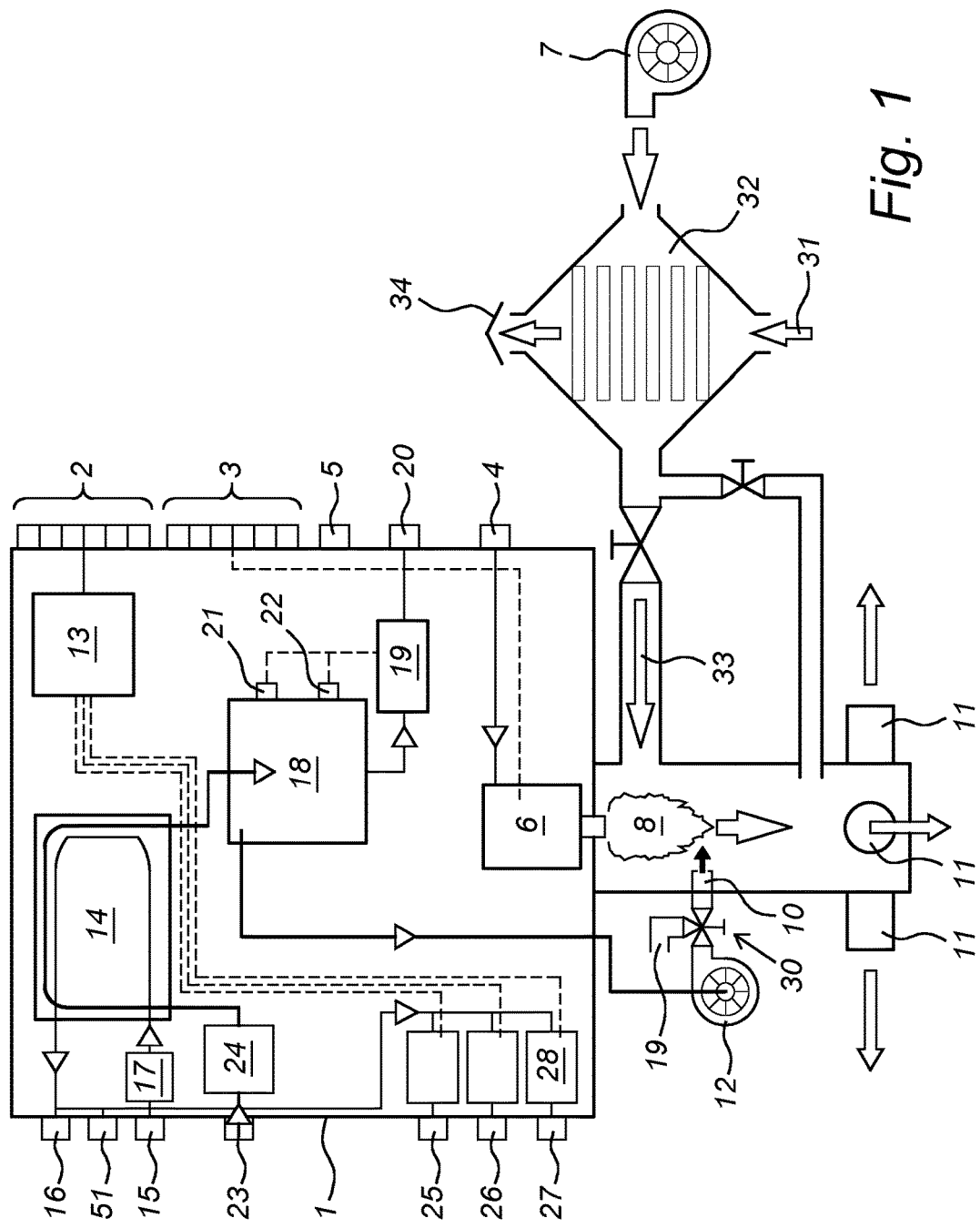
FIG. 1 represents the components of the system's housing.

The invention relates to a system, a device, and a process for treating and decontaminating soils by thermal treatment and water vapor injection.

The system and the process allow for an increase in temperature of a contaminated soil or contaminated material thanks to the forced circulation of a heat-transfer fluid, such as water vapor, in order to displace and extract pollutants.

In the method and the system of the invention, the water vapor is created in the soil to be treated. Thus, the method and system of the invention are deprived of above-ground installation in which high-pressure vapor is circulated. This allows for a simplification of the process and setup required for the treatment.

The word "approximately" as used herein refers to a measurable value, such as a parameter, a quantity, or a time interval. The word "approximately" covers variations of +/−25% or less, preferably +/−10% or less, more preferably +/−5% or less, even more preferably +/−1% or less, and even more preferably +/−0.1% or less than and of the specified value, insofar that such variations are appropriate to implement the invention described here. However, it is to be understood that the value to which the word "approximately" refers is itself specifically described.

The invention allows the thermal treatment of soils, aquifers, and any other material contaminated by volatile and semi-volatile compounds having a boiling point at atmospheric pressure< to 550° C. Compared with those described in the prior art, the process and system of this invention are efficient, simple and easy to implement, have a low installation cost, a high energetic efficiency, and a fast treatment.

In a first aspect, the present invention provides a process for treating and/or decontaminating porous materials 49 and/or aquifers. The process comprises the following steps:

creating in the porous material at least one heater well in order to heat said porous material, said heater well comprising at least one heater tube and at least one pressurized liquid injection well, creating in said porous material at least one extraction well to extract the contaminant vapor, applying at the surface of the porous material a layer of watertight material, connecting the heater well and the extraction well to at least one housing comprising at least one heater module, one pressurized liquid injection module and one recovery module, said housing can be placed outside of the porous material, supplying the heat, via the heater module, into the heater tube, thereby heating the heater well, injecting, via the injection module, at least one liquid in the injection tube in order to vaporise and/or evaporate the injected liquid and the contaminant contained in the porous material, thus transforming the contaminants into a vapor of contaminants, and extracting, via the extraction module, the vapor of contaminants generated in the treated porous material and/or at least a part of the liquid present in said porous material through the extraction well, thereby providing a treated and/or decontaminated porous material.

Figure 8:
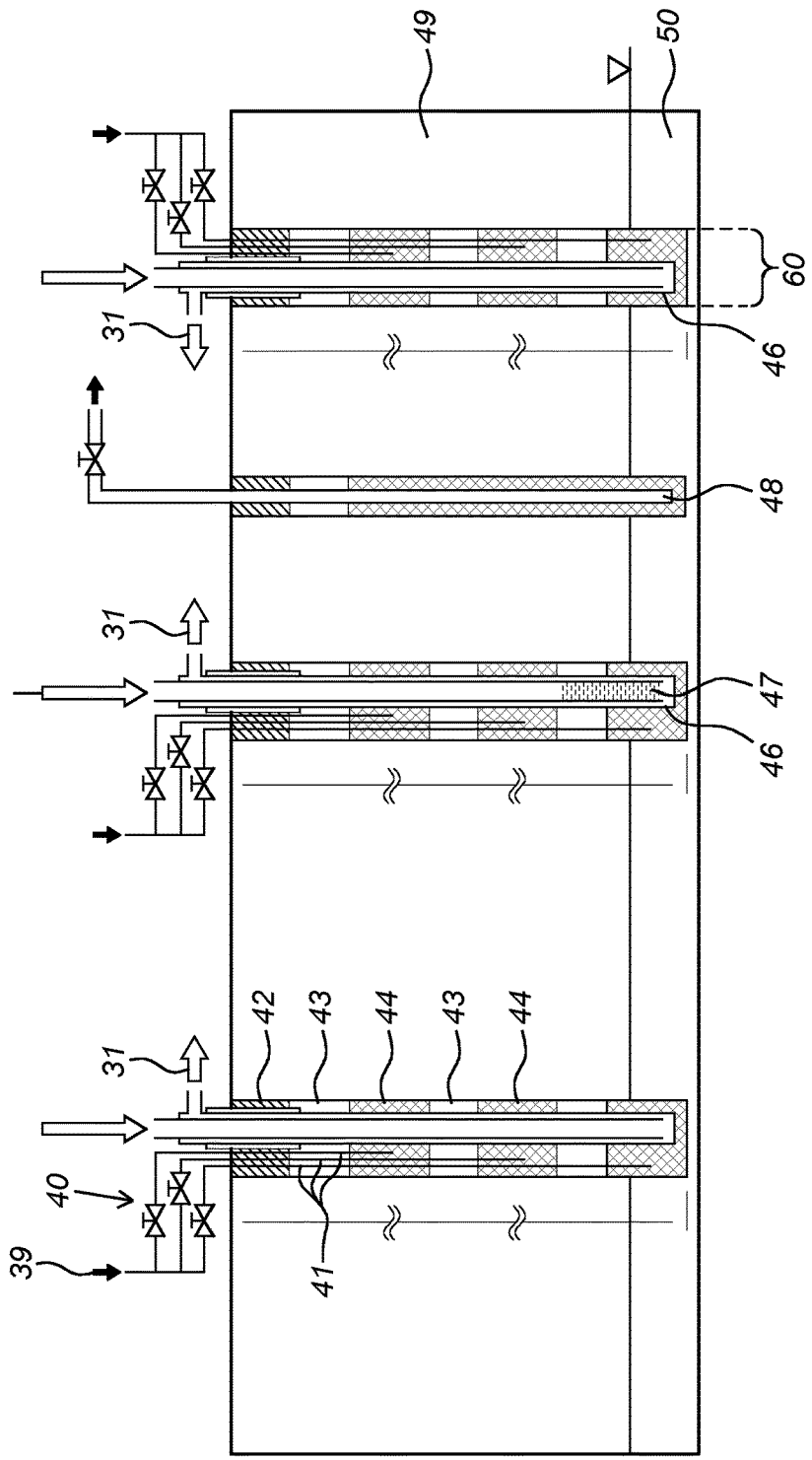
FIG. 8 represents an embodiment of the system of the invention. The heater wells and extraction wells in the soil are represented. These wells are connected to the housing of FIG. 1.

The heater well (60, FIG. 8) can be created by partially excavating a part of the soil and/or by introducing a heater casing tube in said soil. Said heater casing tube comprises the heater tube and the pressurized liquid injection tube. The walls of the heater casing tube and/or of the heater tube (46, FIG. 8) and/or of the pressurized liquid injection tube (41, FIG. 8) are thermally conductive. In a preferred embodiment, the maximal distance between the pressurized liquid injection tube (41, FIG. 8) and the heater tube is 1 meter, preferably 1.2 m, more preferably 1.5 m. Said distance is at least 0.2 m, preferably 0.4 m, more preferably 0.6 m, even more preferably 0.8 m. Both tubes can be in direct contact, meaning that at least a part of the wall of one tube is in direct contact with at least one part of the wall of the other tube. In a preferred embodiment, the heater tubes 46 in FIG. 8 are connected to the heat outlets 11 of the burner 6 of the FIG. 1. This way, the burner supplies heat to the heater wells. A burner can be connected to at least one heater well.

Heater well is also called injection well along this text. This invention covers examples of embodiments in which an injection tube is inserted in each heater well and in which an injection tube is introduced into a heater well by two or more than two.

In a preferred embodiment, the injection tube (41, FIG. 8) corresponds to the space of the heater well that is not occupied by the heater tube. The liquid can thereby be directly injected in the heater well.

The extraction well can be created by excavating a part of the soil and/or by introducing at least one tube having perforated walls in said soil. In order to extract and collect contaminant vapors, vapors of the injected pressurized liquids and of the liquids if present in the well, a strong vacuum is applied into the soil through the extraction well. This vacuum is at least −0.01 bars, preferably close to absolute vacuum. The vacuum is preferably applied using a high pressure extractor placed downstream of the extraction circuit or any other means known by a man skilled in the art.

The watertight material applied to the surface of the soil to be treated 49 may contain fine sand, concrete, a mix of fine sand and concrete or any other material known by a man skilled in the art. The watertight material is applied in layers, and allows to prevent any vapor of the liquid from escaping to the soil. The thickness of the layer of watertight material is at least 40 cm, preferably at least 50 cm, more preferably at least 60 cm and at maximum 100 cm, preferably a maximum of 80 cm, and more preferably a maximum of 70 cm or any other value comprised between those mentioned above. The remainder of the heater well can be filled with at least one permeable material (44, FIG. 8) such as gravel of intermediate size. Said permeable material can be laid inside the heater well before or after introducing heater and injection tubes into the well. Said material will be placed and will fill the void around the tubes contained in the heater well.

Figure 3:
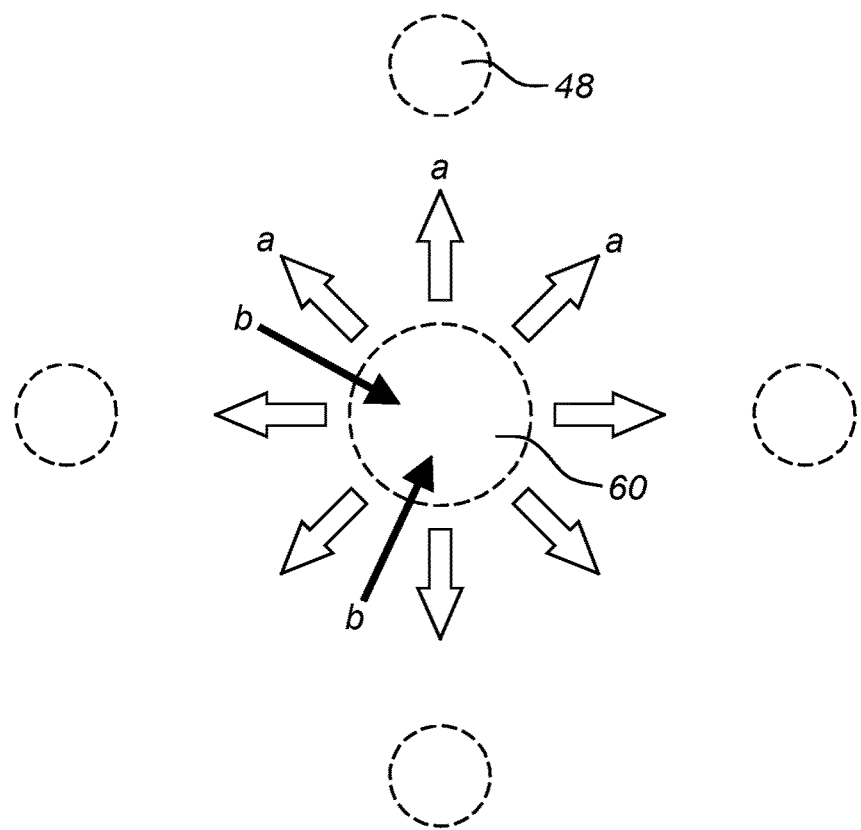
FIG. 3 represents a cross-section of a mode of operation of the system of a soil in which a heater well and extraction wells are inserted.

The LVI process of this invention can be applied in in-situ mode or ex-situ mode, in the vadose zone or in the saturated zone (aquifer and/or phreatic zone). It uses, on one hand, forced convection as a main mechanism for transferring heat to heat the soil at temperatures well in excess of 100° C., and on the other hand, the void to extract water vapors and contaminants that are being produced in the soil. Indeed, during the thermal treatment, the liquid injected into the heater well instantly transforms into vapor under the effect of the heat supplied into the heater tube or into contact with the walls of the heater tube. The vapour will have a high pressure and a high temperature that will vaporise the water initially contained in the soil and any other product present in the soil such as volatile and semi-volatile compounds. The vapor of the liquid allows to heat the soil, by forced circulation between the grains of the soil, to treat the later and to create micro-cracks in the non-permeable zones of the soil. The soil is thus mainly heated by convection. The contaminants contained in the heated soil will thus be vaporized and/or evaporated and will be in the form of contaminant vapors. The micro-cracks increase the efficiency and considerably reduce the treatment time. FIG. 3 represents a mode of operation of the system according to a transverse cross-section of the soil in which a heater well 60 and extraction wells 48 are introduced. Arrows b indicate the direction of heat and water injection in the soil, whereas arrows a indicate the direction of propagation in the soil of the vapor of the liquid injected in the injection wells.

Figure 4:
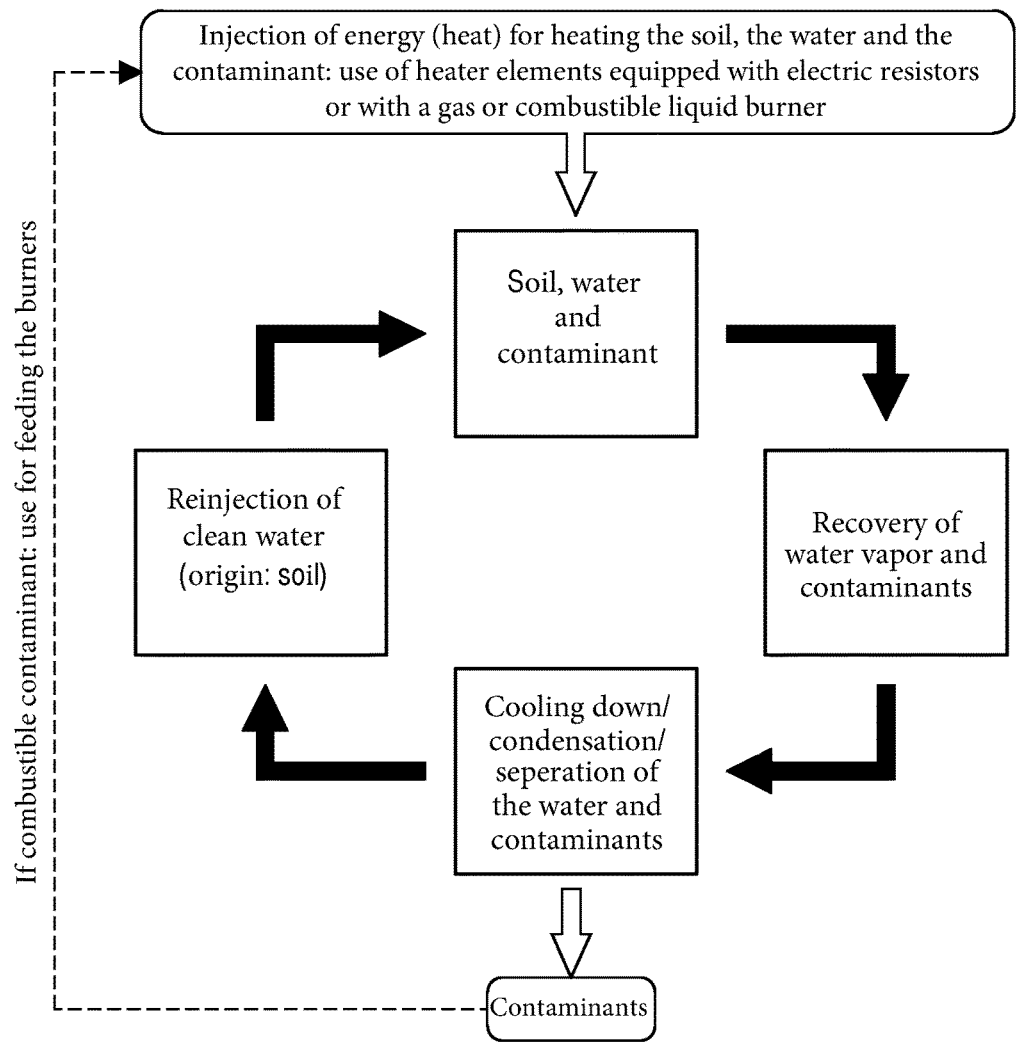
FIG. 4 represents a principle of the functioning of the invention's system and process.

FIG. 4 represents a mode of operation of the system and the process of the invention. The mode of operation of the system and the process of the invention is in the form of a closed loop in which, recovered liquids and/or vapors can be re-used. The energy can also come from collected contaminants that are being used as fuels injected in the burners.

Figure 5:
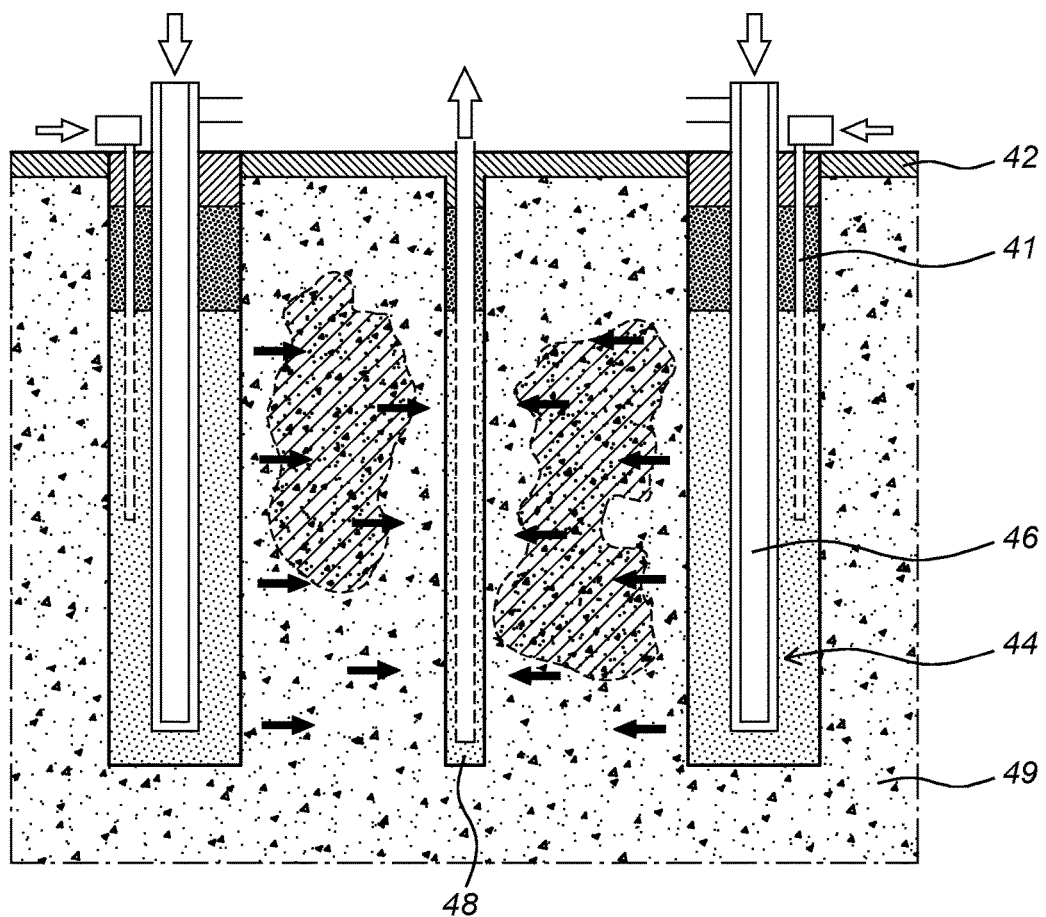
FIG. 5 represents a vertical cross-section of a soil in which heater wells and an extraction well are created.

The process of the invention allows the decontamination of different types of soils, even little impermeable soils. This is feasible thanks to the high temperature and high pressure liquid vapor. Said vapor creates its own path to cross the soil to be treated. In presence of preferential paths generated by the push of high pressure liquid vapor, the heat will be transferred in the soil mainly by convection (circulation of the vapor) but also by conduction and radiation between the soil grains. This heat transmitted to the soil increases the temperature rapidly which allows, in a record time, to reach temperatures that are high enough to vaporise the contaminants present in the soil. The vapors, from the liquid and from the contaminants, thus produced are aspirated out of the soil by the extraction well. The solid arrows on FIG. 5 represent the direction of movement of the vapors in the soil, i.e. towards the extraction well 48. On FIG. 5 the vapors are represented by the criss-crossed zone.

In a preferred embodiment, the temperature of the vapor obtained by evaporating and/or vaporising the injected liquid is at least 200° C., preferably at least 250° C., more preferably at least 300° C. Said temperature can reach 550° C., preferably 500° C., more preferably 450° C. or any other values comprised between those mentioned above.

In a preferred embodiment, the action of supplying heat and/or injecting the pressurized liquid and/or extracting contaminant vapor is performed in a continuous manner. In a preferred embodiment, the action of supplying heat and/or injecting pressurized liquid and/or extracting contaminant vapor is performed in a discontinuous manner.

In a preferred embodiment, the heater module and thus the burner have an alternating and periodic functioning with a period of injection of liquid followed by a period without injection. By maintaining extraction through the extraction well, the periodical operation reduces the quantity of liquid required for the treatment and reduces the global treatment time.

The operation of the burner is periodical with a period of heating of the heater tubes until the maximal heating temperature followed by a period of heating the soil only. The maximal heating temperature is comprised between 550° C. and 750° C. During the period of soil heating only, the energy stored in a heat accumulator present in the heater tubes provides heat to the soil and maintains the temperature of the tubes in the range of 350-550° C. During this period of heating the tubes; the burner is lit continuously and it is stopped or at low regime of functioning during the period of heating of the soil by the energy stored in the tubes by the heat accumulator.

Figure 6:
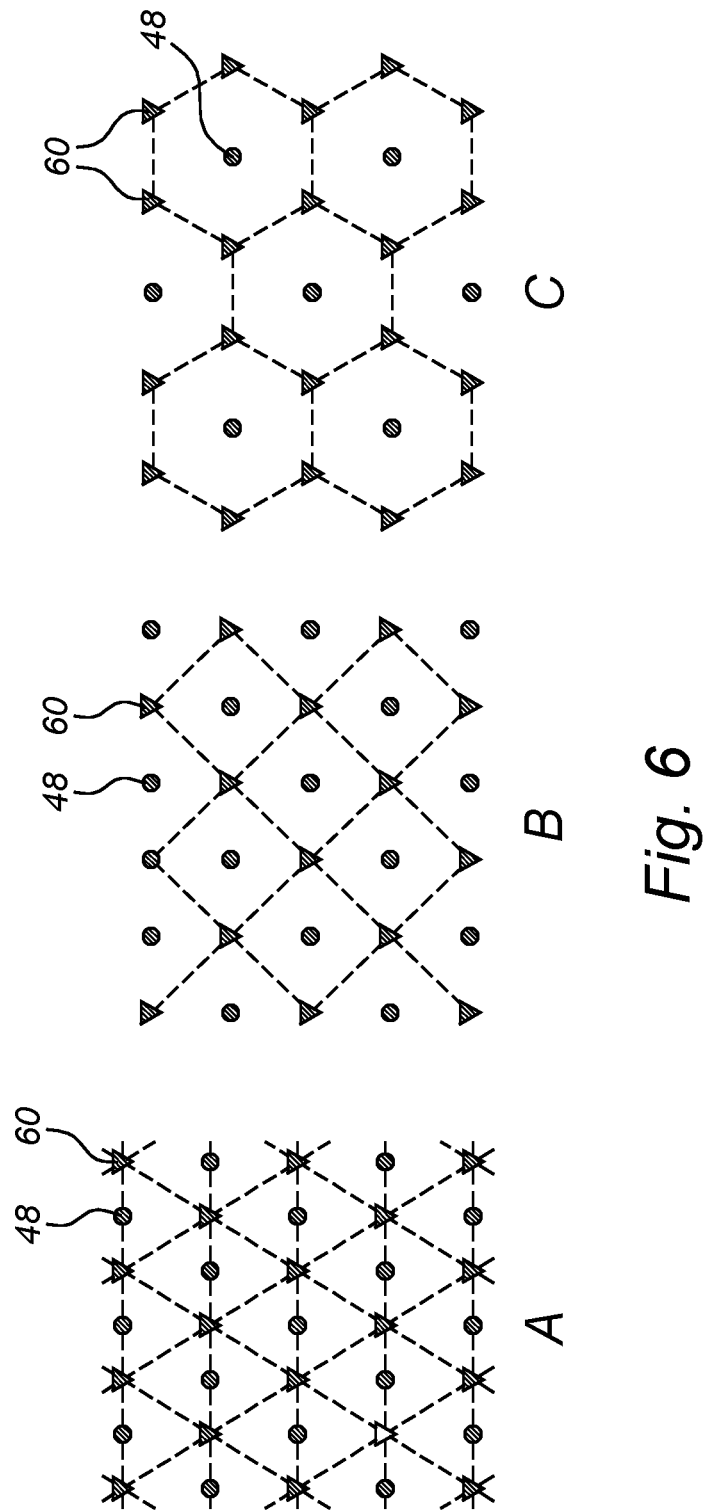
FIGS. 6A-6C represents different configurations for creating and/or introducing tubes of the system in the soil to be treated.

The liquid injected in the heater well can be water, water supplemented with at least one chemical or any other liquid. The liquid can be at ambient temperature or pre-heated. The pre-heating temperature can vary from ambient temperature up to approximately 80° C., preferably approximately 95° C. The liquid is injected under pressure in the injection tubes, also called injection wells, which can be placed with reference to the soil surface, horizontally, vertically or oblique according to a well-specified geometry in the contaminated zone of the soil (FIG. 6).

The liquid can come from the soil itself, using the water initially present in the soil, and/or of any other source like for example an aquifer or an external source. When using liquid or water collected from the soil or from the aquifer, the process of the invention will not necessitate any external supply of water. The liquid can be injected with a constant flow and/or continuously by an electrical high-pressure mini-pump. The liquid can also be injected by impulsions by alternating a period of injection and a period without injection. Said periods last at least 1 second, preferably 3 seconds, more preferably 5 seconds, even more preferably 10 seconds. Said periods last at most 30 seconds, preferably 25 seconds, more preferably 20 seconds, even more preferably 15 seconds. The mode of operation using impulsions allows a better management of the operation of the process. More precisely, a pressure sensor connected to the mini-pump is placed inside the injection tube and/or inside the injection well and commands the operation of said pump in function of the pressure measured inside the well. An electro-valve can be placed after the water injection pump. A non-return valve can also be placed after the pump.

The mini-pump of the system can have a maximum water flow of 10L/h per linear meter of heater tube, preferably 9 L/h, more preferably 8 L/h, even more preferably 7 L/h, even more preferably 6 L/h, even more preferably 5 L/h. The minimum water flow is 2 L/h, preferably 3 L/h, more preferably 4 L/h. The maximum pressure is 10 bars, preferably 12 bars, more preferably 14 bars, even more preferably 15 bars, even more preferably 20 bars, even more preferably 25 bars, even more preferably 30 bars. The minimum pressure is 2 bars, preferably 4 bars, more preferably 6 bars, even more preferably 8 bars. Any other mini-pump having the same flow or a different flow and/or which provides an higher or lower pressure can be used.

Heating elements comprised in the heating module of the housing heat the injection well. The heating temperature is comprised between 200 and 550° C., preferably between 250 and 500° C., more preferably between 300 and 400° C. Heating elements can be electrical resistors or metallic tubes equipped with one or more gas or combustible liquid burners or any other heating element known by a man skilled in the art.

The energy present in the heater well and that continuously coming from the heating elements vaporise instantly in-situ the liquid injected in the injector tube. The liquid is then transformed into a high-temperature vapor. Said high temperature is above 100° C. and said high pressure is above 10 bars.

The temperature of the liquid vapor depends on the energy conveyed by the gases in the heating elements and/or on the heating power of the electrical resistance. The temperature of the liquid vapor depends on the heating element (heating power) and on the quantity of liquid injected in the heater well. As far as vapor pressure is concerned, it depends on the permeability of the medium and therefore of the soil to be treated. The more permeable the soil, the lower the vapor pressure is. The vapor from the pressurized liquid is forced into the soil and carries all the liquids present in the soil but also causes the evaporation and/or the vaporisation of the contaminants contained in the soil.

The injection of liquid can be continuous or pulsed. The vapors from the contaminants and the liquids are collected in the extraction well. After recovery, the contaminant vapors and the liquids are cooled and separated. The collected liquid is re-injected again into the soil via the injection well. The cycle is repeated until the contaminants are totally eliminated.

Several sensors are used to monitor the functioning of the treatment. For example, pressure sensors and temperature sensors are placed in several places in the extraction wells and/or in the injection wells and/or in the soil to be treated. The analysis of the vapor collected at the outlet of an extraction well during the treatment allows the follow-up of the treatment evolution. When the concentration of contaminants drops considerably and/or is absent in the vapors and recovered liquids, the treatment can be considered as completed in the area of the well in question.

In order to stop the treatment, heat is no longer supplied into the heater tube by the heater module. After the stopping of the heating, the aspiration by the extraction well can be interrupted or can be maintained. The injection of at least one cold liquid in the injection tube can be maintained, thereby accelerating the cool-down of the treated soil and its re-humidification so as to restore the soil back to its original pre-treatment condition.

The quantity of liquid collected at the end of the treatment is almost zero, the volume is approximately 0 liter. Contaminants are recovered in liquid form in tanks connected to the housing. The number of tanks depends on the initial quantity of contaminants contained in the soil.

In a preferred embodiment, the extracted liquid is re-injected into the injection tube and/or the vapor of contaminants extracted from the soil is re-injected into the heater module.

In summary, the heat of the heating element and that contained in the injection well are transmitted to the liquid injected into the well. This heat exchange transforms the liquid into vapor at high temperature and at high pressure.

This vapour travels through the soil, circulating between its grains, thanks to the pressure difference created between the injection well and the extraction well. The travelling vapour transforms the contaminants into contaminant vapors that will be carried and directed to the extraction well.

After passing through the soil, the vapor is cooled, transformed back into water, separated from the pollutant and sent back to the injection well for a new cycle.

The process of the invention is more efficient compared with processes from the prior art because it allows to reach temperatures in the soil that are well beyond 100° C.

In another aspect, the present invention provides a system for treating and/or decontaminating porous materials and/or aquifers. The system comprises:
- at least one housing comprising at least one heating module, one pressurized liquid injection module, and one recovery module, said housing can be placed outside of the porous material to be treated,
- heating means susceptible to be introduced into the porous material, said heating means comprise at least a heater tube having an external thermally-conductive wall, said heater tube can be connected to the heater module; and at least one pressurized liquid injection tube that can be connected to the pressurized liquid injection module, said heater and pressurized liquid injection tubes do not have perforations,
- at least one vapor extraction means to extract the contaminant vapor, said extraction means is susceptible to be created inside the porous material and can be connected to the recovery module, and
- at least one layer of watertight material (42, FIG. 8) that can be applied to the surface of the porous material to be treated.

In a preferred embodiment, the extraction well can be created by excavating a part of the soil and/or by introducing at least one tube having perforated walls into said soil.

Figure 7:
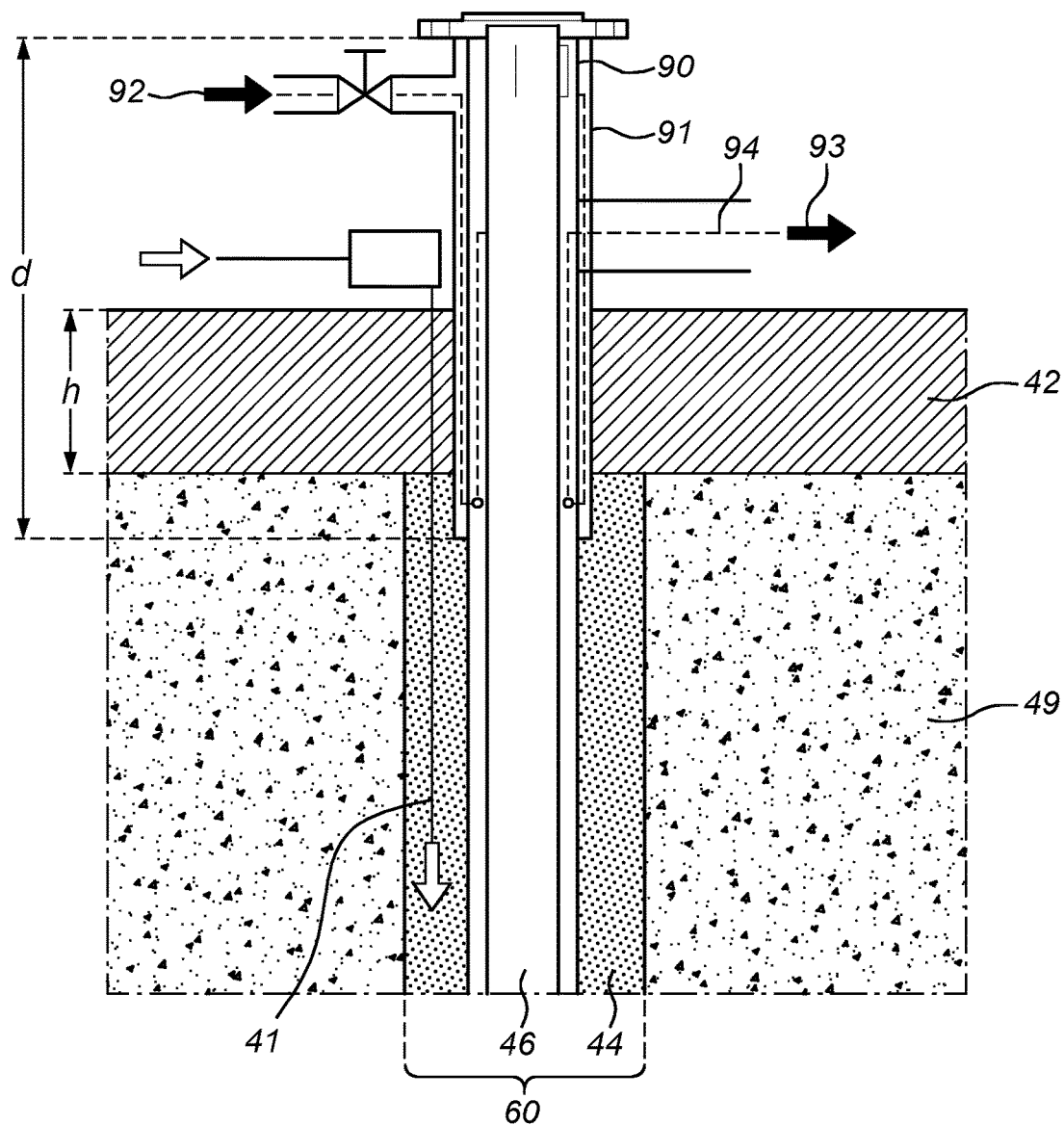
FIG. 7 represents a heater well created in the soil and comprising a heater tube and an injection tube.

In a preferred embodiment, the external wall 90 of the heater tube is covered by a second external wall 91 possessing at least one inlet 92 and at least one outlet 93, said second external wall thus defining an external space 94 in which fresh air is circulated (solid arrows in FIG. 7).

In a preferred embodiment, the second external wall of the heater tube extends over a length "d" FIG. 7 which is proximal to the housing and which corresponds to at least the height "h" of the layer of watertight material 42. This prevents overheating and thus the presence of cracking in the layer of watertight material under the effect of the heat. The heater tube thus comprises three envelopes on at least a part of its length that extends over the distance "d". The upper part (50 cm from the top). Between the second and the third envelope, fresh air is circulated to cool down the external envelope. The value of "d" is at least equal to the thickness of the layer of watertight material mentioned above.

The housing of the LVI system is represented by the housing 1 (FIG. 1). The housing can be placed outside the soil. The dimensions of the housing can be approximately 500 mm in height, 400 mm in width and 250 mm in thickness. The weight of the whole of the housing does not exceed 30 kg. The housing is thus not cumbersome and easily transportable. The housing 1 comprises a heater module, a pressurized liquid injection module, a recovery module for products coming from the soil and a treatment control module.

The heater module comprises a burner 6 on fuel gas or liquid. The fuel is supplied to the burner via an external fuel source. 4 After cooling, in the heat exchanger 14, the vapors coming from the soil through the extraction well 48 and/or the uncondensed gases are sent directly into the flame 10 of the burner to be oxidised into less harmful products ($H_2O$ and $CO_2$, ...) or directed to an outlet 29 for an external treatment. A 3-way valve 30 allows the selection of the moment when the vapors and/or gases are sent to the burner: at the beginning or during the treatment.

In a preferred embodiment, the burner 6 has a periodical operation mode. Said mode has two regimes: a low regime and thus low-power and a high regime and thus high power. The burner 6 therefore allows for considerable energy savings. In a preferred embodiment, the burner 6 has more than one outlet for hot gases 11, FIG. 1 by which heat is supplied to the heater well.

In a preferred embodiment, each heater tube comprises at least one heat accumulator (47, FIG. 8). The heat accumulator can be a supplemental mass that enables the storage of heat coming from the burner. The heat accumulator 47 can be metallic or ceramic or any other material capable of storing heat and having a thermal conductivity above or equal to 5 W/mK. This allows to maintain a constant wall temperature of the heater tube while saving energy on the burner.

The extraction module is equipped with a heat exchanger/condenser 14, a gas/liquid separator 18, a liquid recovery pump 19 controlled by level probes 21, 22 and a high pressure extractor 12.

Figure 2:
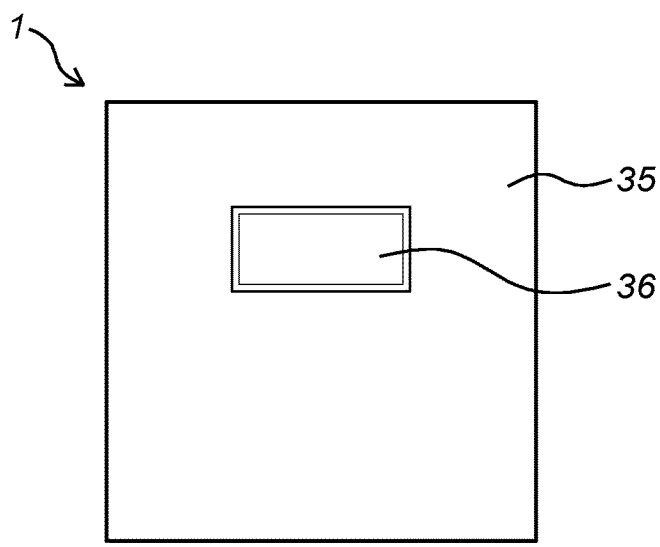
FIG. 2 represents an external view of the housing.

The programmable controller PLC (36, FIG. 2) controls and regulates the whole installation during treatment. This allows the automation of the process. The PLC is accessible to the user via at least one of the external surfaces 35 of the housing 1 and/or remotely (remote connection).

After cool down in the heat exchanger/condenser 14, the vapors coming from the soil through the extraction well (48, FIG. 8) and/or uncondensed gases are sent directly to the flame 8 of the burner 6 to be oxidised into less harmful products ($H_2O$ and $CO_2$, ...) or directed to the outlet 29 for external treatment.

A dust filter 24 and/or a water filter 17 is placed upstream of the heat exchanger/condenser 14 and allows to avoid clogging of the whole installation. The heat exchanger/condenser 14 is cooled down using fresh air thanks to a fan which is placed on said exchanger or cooled by a liquid, such as water, which enters the housing through at least one inlet 15 and exists through at least one outlet 16.

In a preferred embodiment, the housing comprises at least a cooling circuit to cool down the system and to ensure its continuous functioning. The cooling circuit is connected to the extraction well and comprises at least one heat exchanger/condenser that condenses the vapor exiting said well. The condenser is a device comprising tubes in which a cold fluid circulates: air or cold water coming from the soil or taken from an external source. When coming into contact with these tubes, the vapor extracted from the soil condenses in order to transform into water.

The liquid coming from the soil is recovered after condensation and can be treated externally in a housing placed close to the treated soil. Said liquid can be used to cool down the heat exchanger/condenser 14. The same liquid can be re-injected, through the connections 25, 26 and 27, in an injection tube using a high pressure pump 28. In a preferred embodiment, the liquid injected into the injection tube comprises at least one chemical product. Preferably an oxidation chemical. The liquid with the chemical can be injected at any moment during the treatment. Preferably, said liquid is injected after thermal treatment. This can complement the thermal treatment and can be used for chemical treatment of a source or a pollution plume in the aquifer. Said chemical can come from an external source through an inlet 51.

All connections to the housing such as water connections 15, 16, 25, 26, 27, for gas, electricity 5, vapor 23, 20, the pressure gauges 2, the thermocouples 3, the external fuel source 4, the chemical inlet 51 on FIG. 1 are watertight and placed outside the housing. At least, the water, vapor and gas connections are made with quick pneumatic connectors.

The various pressure and temperature sensors allow, through at least one pressure transducer 13 and/or through the PLC, to monitor, follow-up and dose the injection of heat and water into the soil in order to optimise treatment. The pressure transducer 13 and/or PLC also allows the remote communication with the installation but also to stop the treatment in case of a problem.

In a preferred embodiment, the heater module is connected to at least one heat exchanger 32 comprising at least one fan 7. The exchanger can be an air/air exchanger. In order to improve the thermal efficiency of the process, primary air 33 is supplied to the heater module. This primary air is pre-heated by heater gases 31 recovered at the outlet of the heater wells 60. An air-air heat exchanger 32 is used to recover the gases. After passing through the heat exchanger 32, heater gases pass through a main extractor before being released by a chimney 34.

In a preferred embodiment, a fixed number of heater tubes are placed in heater wells. Also, a fixed number of extraction wells are placed and created. This number can be 2, 3, 4, 5 or more. The number of heater tubes and that of extractor wells can be equal or not.

Liquid is injected through one or more injection tubes (41, FIG. 8) along the heater well. The injection of liquid can be performed at various levels by using several injection tubes of various length (FIG. 8). Water injection in injection wells is performed by high-pressure liquid pumps 28. As soon as it is injected, the water transforms instantly into vapor at high temperature and high pressure. The water vapor circulates through the soil thanks to the pressure difference created by its own pressure and the prevailing pressure in the extraction wells.

In a preferred embodiment several heater and/or injection tubes and/or extraction wells are introduced into the soil to be treated. Said tubes have a different/variable length. This allows the selective treatment of different zones of the soil extending over different depths. As an example, two liquid injection tubes of different length are introduced into the soil to be treated. The longer tube allows the injection of the liquid at a depth "P" of the soil whereas the shorter tube enables the injection of the liquid at a depth "P'" of the soil. The user will be able to choose the depth at which the soil will be treated by injecting the liquid in the injection tube corresponding to the depth he has chosen, thereby determining the section of the soil to be treated. This example is represented on FIG. 8 where several injection tubes 41 are represented. More than two heater and/or injection tubes and/or extraction wells can be used.

For a separate treatment, the heater well can also be divided into distinct zones (FIG. 8). These zones will be separated by a layer of watertight material 43. A water injection tube 41 will be placed in each zone. For collecting vapors (water and contaminant), a high vacuum will be applied to the soil through the extraction well 45 by the extractor 12.

The heater tube and/or the injection tube that can be used in the system of the invention can be a tube available on the market and can have any geometric shape: circular, rectangular, triangular, hexagonal or other. Tubes and tubular products made of steel can be used. Among the latter are: NF A 49-111, NF A 49-115, NF A 49-141, NF A 49-145, NF A 49-150, NF A 49-190, NF A 49-700, NF EN 253, NF EN 448.

The placing and positioning of the heater wells and the extraction wells determine the efficiency of the treatment. This choice can rely on an in-depth knowledge of the characteristics of the soil such as permeability, humidity and the distribution of the pollutant. When the zone to be treated is large enough, the soil necessarily displays heterogeneity. In that case, the wells can have a triangular configuration (A and B, FIG. 6). This configuration alternates between heater wells and extraction wells in such a way that each well type is surrounded by four wells of the other type.

The soil heterogeneity and/or the distribution of the pollutant is taken into account for implanting the wells: spacing and positions of the wells.

When the zone to be treated is small and/or permeable and/or homogeneous, the distance between the extraction wells can be more important and the hexagonal configuration (C, FIG. 6) can be used. In this configuration, each extraction well is surrounded by 6 heater wells.

In the triangular configuration, a spacing between two wells varies between 1.5 m to 4 m, preferably from 2 m to 3 m. In the case of a hexagonal configuration, the spacing can vary from 2 to 5 m. In both cases, the nature of the soil and that of the contaminant determine the distance between the wells.

The invention allows to increase the temperature of the soil or of a contaminated material thanks to the forced circulation of a heat-conveying fluid, in order to displace and extract the pollutant. The soil is heated by conduction in a first phase in order to increase the soil permeability. In a second phase, a liquid is injected ad hoc and will be vaporized. This injection can be repeated several times in a row to obtain an adequate injection. The invention enables the injection of chemical oxidizing reagents, or reducers into a polluted soil in such a way that they react in the mass with the pollutants.

The injection of fluids under pressure allows for fluidizing hydrocarbons and thus increases the extraction rate of underground hydrocarbons.

In another embodiment, the invention provides for the use of the system such as described above for treating soils and/or aquifers according to the process of the invention.

It should be noted that the preferred embodiments of the system of the invention are applicable to the process of the invention and vice versa.

The embodiment described in what precedes and illustrated in the enclosed figures is an example given as an illustration and the invention is never limited to this example. Any modification, any variation and any equivalent arrangement should be considered as included in the scope of the invention.

What is claimed is:

1. A method for treating and/or decontaminating porous materials in aquifers comprising:
   creating in the porous material at least one heater well to heat the porous material, said heater well comprising at least a heating tube and at least a pressurized liquid injection tube,
   creating in said porous material at least one extraction well to extract contaminant vapor,
   applying to the surface of the porous material a layer of watertight material,
   connecting the heater well and the extraction well to at least one housing comprising at least one heater module, one pressurized liquid injection module and one recovery module, said housing can be placed outside of the porous material, supplying heat, via the heater module, in the heating tube thereby heating the heater well, injecting, via the injection module, at least one liquid in the injection tube to vaporize and/or evaporate the injected liquid and the contaminants present in the porous material, thus transforming the contaminants into contaminant vapor, and extracting, via an extraction module, the contaminant vapor generated in the treated porous material and/or at least a part of the liquid present in said porous material through the extraction well, wherein the vapor temperature obtained by evaporating and/or vaporizing the injected liquid is at least 200° C.

2. The method according to claim 1 wherein supplying heat in the heating tube and/or injecting pressurized liquid into the injection tube and/or extracting contaminant vapor is carried out in a continuous manner.

3. The method according to claim 1 wherein supplying heat in the heating tube and/or injecting pressurized liquid into the injection tube and/or extracting contaminant vapor is carried out in a discontinuous manner.

4. The method according to claim 1 wherein the liquid injected in the injection tube comes from the porous material to be treated.

5. The method according to claim 1 wherein at least one permeable material is inserted in the heater well.

6. The method according to claim 1 wherein the heater well and/or the extraction well is created by inserting a tube into the porous material and/or by excavating a part of the porous material.

7. The method according to claim 1 wherein the maximum distance between the pressurized liquid injection tube and the heater tube is 1.5 meters.

8. The method according to claim 1 wherein the liquid extracted from the porous material is reinjected into the injection tube.

9. The method according to claim 1 wherein contaminant vapor extracted from the porous material is reinjected into the heater module.

10. A system for treating and/or decontaminating porous materials and/or aquifers comprising:

at least one housing comprising at least one heater module, one pressurized liquid injection module and one recovery module, said housing being placeable outside of the porous material to be treated, heating means configured to be introduced into the porous material, said heating means comprising at least one heater tube having a thermally-conductive external wall, said tube being connectable to the heater module; and at least one pressurized liquid injection tube connected to the pressurized liquid injection module, said heating and pressurized liquid injection tubes not having perforations, at least one vapor extractor configured to extract contaminant vapor, said vapor extractor being creatable inside the porous material and being connectable to the recovery module, and at least one layer of watertight material that can be applied to the surface of the porous material to be treated, wherein the at least one heater tube and/or at least one injection tube have a different length.

11. The system according to claim 10 wherein the external wall of the heater tube is covered by a second external wall having at least one inlet and at least one outlet, said second external wall thus defining an external space in which fresh air is circulated.

12. The system according to claim 11 wherein the second wall of the heater tube extends over a distance "d" which is proximal to the housing and which corresponds to at least the height of the layer of watertight material.

13. The system according to claim 10 wherein the heater tubes and/or injection tubes and/or extraction tubes are introduced horizontally and/or vertically and/or oblique in the porous material.

14. A method for treating and/or decontaminating porous materials and/or aquifers with the system of claim 10 comprising:

creating in the porous material at least one heater well to heat the porous material, said heater well comprising the at least one heating tube and the at least one pressurized liquid injection tube, creating in said porous material at least one extraction well to extract contaminant vapor, applying to the surface of the porous material the layer of watertight material, connecting the heater well and the extraction well to the at least one housing comprising at the least one heater module, the one pressurized liquid injection module and the one recovery module, said housing can be placed outside of the porous material, supplying heat, via the heater module, in the heater tube thereby heating the heater well, injecting, via the injection module, at least one liquid in the injection tube to vaporize and/or evaporate the injected liquid and the contaminants present in the porous material, thus transforming the contaminants into contaminant vapor, and extracting, via the extraction module, the contaminant vapor generated in the treated porous material and/or at least a part of the liquid present in said porous material through the extraction well, wherein the vapor temperature obtained by evaporating and/or vaporizing the injected liquid is at least 200° C.

* * * * *